United States Patent
Mae et al.

(10) Patent No.: US 12,379,727 B2
(45) Date of Patent: Aug. 5, 2025

(54) ANOMALY DETECTION DEVICE, VEHICLE, AND ANOMALY DETECTION METHOD

(71) Applicants: KABUSHIKI KAISHA TOYOTA JIDOSHOKKI, Kariya (JP); National Institute of Advanced Industrial Science and Technology, Tokyo (JP)

(72) Inventors: Shinichi Mae, Tsukuba (JP); Yukikazu Koide, Tsukuba (JP); Hironobu Okamoto, Tsukuba (JP); Ryusuke Sagawa, Tsukuba (JP)

(73) Assignees: KABUSHIKI KAISHA TOYOTA JIDOSHOKKI, Kariya (JP); National Institute of Advanced Industrial Science and Technology, Tokyo (JP)

( * ) Notice: Subject to any disclaimer, the term of this patent is extended or adjusted under 35 U.S.C. 154(b) by 113 days.

(21) Appl. No.: 18/326,542

(22) Filed: May 31, 2023

(65) Prior Publication Data
US 2023/0393585 A1   Dec. 7, 2023

(30) Foreign Application Priority Data
Jun. 7, 2022   (JP) .................. 2022-092265

(51) Int. Cl.
*G05D 1/02*   (2020.01)
*G05D 1/00*   (2006.01)

(52) U.S. Cl.
CPC ......... *G05D 1/0274* (2013.01); *G05D 1/0214* (2013.01); *B60W 2556/50* (2020.02)

(58) Field of Classification Search
CPC ............... G05D 1/0274; G05D 1/0214; G05D 2105/28; G05D 1/2247; G05D 1/80; G05D 2107/70; G05D 2109/10; G05D 1/246; G05D 2111/10; G05D 1/243; B60W 2556/50; B66F 9/063; B66F 9/0755; B66F 17/003; G07C 3/00; G07C 5/0866

See application file for complete search history.

(56) References Cited

U.S. PATENT DOCUMENTS

2022/0375206 A1 * 11/2022 Onoda .................. B66F 9/0755
2023/0348247 A1   11/2023 Takao
2024/0134047 A1    4/2024 Inoue et al.

FOREIGN PATENT DOCUMENTS

| DE | 11 2022 001 463 T5 | 12/2023 |
| JP | 2021-62964 A | 4/2021 |
| JP | 2022-143404 A | 10/2022 |
| WO | 2021/171974 A1 | 9/2021 |

* cited by examiner

*Primary Examiner* — Brian P Sweeney
(74) *Attorney, Agent, or Firm* — Sughrue Mion, PLLC (57) ABSTRACT

An anomaly detection device includes processing circuitry and a memory. The memory stores map data and association data. The map data defines a map. The map receives, as input data, manipulation value data and the image data of the vehicle, thereby outputting, as output data, a state ID corresponding to an anomaly state related to the vehicle. The association data associates an anomaly state related to the vehicle with the state ID. The processing circuitry is configured to acquire the manipulation value data, acquire the image data from a camera mounted in the vehicle, input, as the input data, the manipulation value data and the image data, to the map, thereby acquiring, as the output data, the state ID from the map, and identify the anomaly state related to the vehicle based on the state ID acquired from the map and the association data.

6 Claims, 5 Drawing Sheets

ANOMALY DETECTION DEVICE, VEHICLE, AND ANOMALY DETECTION METHOD

BACKGROUND

1. Field

The present disclosure relates to an anomaly detection device, a vehicle, and an anomaly detection method.

2. Description of Related Art

Japanese Laid-Open Patent Publication No. 2021-62964 discloses a forklift as a vehicle that performs autonomous traveling.

During operation of the vehicle, an anomaly may occur in the vehicle. When an anomaly occurs in the vehicle, it is necessary to detect the anomaly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an anomaly detection device is configured to detect an anomaly related to a vehicle. The anomaly detection device includes processing circuitry and a memory. The memory stores map data and association data. The map data defines a map. The map receives, as input data, manipulation value data and the image data of the vehicle, thereby outputting, as output data, a state ID corresponding to an anomaly state related to the vehicle. The association data associates an anomaly state related to the vehicle with the state ID. The processing circuitry is configured to acquire the manipulation value data, acquire the image data from a camera mounted in the vehicle, input, as the input data, the manipulation value data and the image data, to the map, thereby acquiring, as the output data, the state ID from the map, and identify the anomaly state related to the vehicle based on the state ID acquired from the map and the association data.

In another general aspect, a vehicle includes the above-described anomaly detection device.

In a further general aspect, an anomaly detection method for detecting an anomaly related to a vehicle is provided. The anomaly detection method includes: storing map data and association data in a memory, the map data defining a map, the map outputting, as output data, a state ID corresponding to an anomaly state related to the vehicle when receiving, as input data, manipulation value data and image data of the vehicle, and the association data associating an anomaly state related to the vehicle with the state ID; acquiring the manipulation value data of the vehicle; acquiring the image data from a camera mounted in the vehicle; inputting, as input data, manipulation value data and the image data into the map, thereby acquiring, as output data, a state ID corresponding to an anomaly state related to the vehicle; and identifying the anomaly state related to the vehicle based on the state ID acquired from the map and the association data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An anomaly detection device and a vehicle according to one embodiment will now be described.

Figure 1:
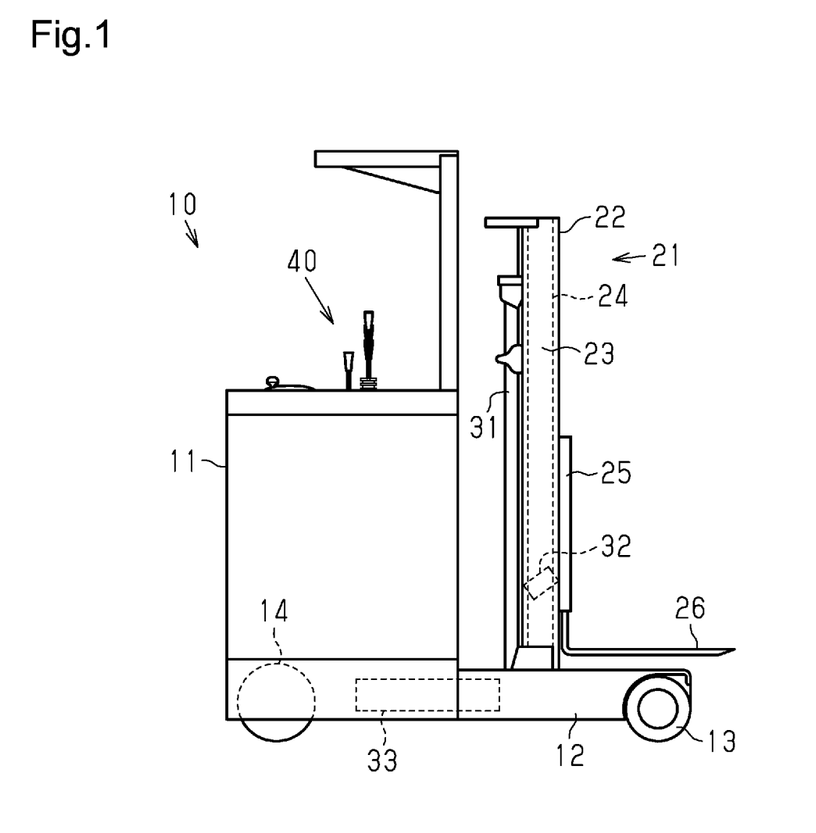
FIG. 1 is a side view of a material handling vehicle according to an embodiment.

As shown in FIG. 1, a material handling vehicle 10 is a reach forklift. The material handling vehicle 10 is a vehicle. The material handling vehicle 10 is configured to switch an operation mode between a manual operation operated by an operator on board the material handling vehicle 10 and an automatic operation. In the following description, directional terms such as front, rear, left, and right agree with front, rear, left, and right with reference to the material handling vehicle 10.

The material handling vehicle 10 includes a vehicle body 11, reach legs 12, front wheels 13, rear wheels 14, a material handling device 21, and a manipulation portion 40.

The reach legs 12, of which there are two, are spaced apart from each other in a left-right direction. The reach legs 12 extend forward from the vehicle body 11.

The front wheels 13 are respectively provided in the two reach legs 12. The rear wheels 14 are provided in the vehicle body 11. The rear wheels 14 are steered wheels. The rear wheels 14 are driven wheels.

The material handling device 21 is provided in front of the vehicle body 11. The material handling device 21 includes mast assemblies 22, a lift bracket 25, forks 26, lift cylinders 31, tilt cylinders 32, and a reach cylinder 33.

The mast assemblies 22 are multistage mast assemblies. The mast assemblies 22 each include an outer mast 23 and an inner mast 24. The inner mast 24 is provided to be movable vertically with respect to the outer mast 23.

The forks 26 are fixed to the lift bracket 25. The forks 26, of which there are two, are spaced apart from each other in the left-right direction.

The lift cylinder 31 includes a hydraulic cylinder. The lift bracket 25 is moved vertically by supply and discharge of hydraulic oil to and from the lift cylinder 31. The forks 26 are moved vertically together with the lift bracket 25.

The tilt cylinder 32 includes a hydraulic cylinder. The lift bracket 25 is tilted in a front-rear direction by supply and discharge of hydraulic oil to and from the tilt cylinder 32. The forks 26 tilt together with the lift bracket 25.

The reach cylinder 33 includes a hydraulic cylinder. The mast assemblies 22 are moved horizontally in the front-rear direction by supply and discharge of hydraulic oil to and from the reach cylinder 33. The forks 26 move horizontally in the front-rear direction together with the mast assemblies 22.

Figure 2:
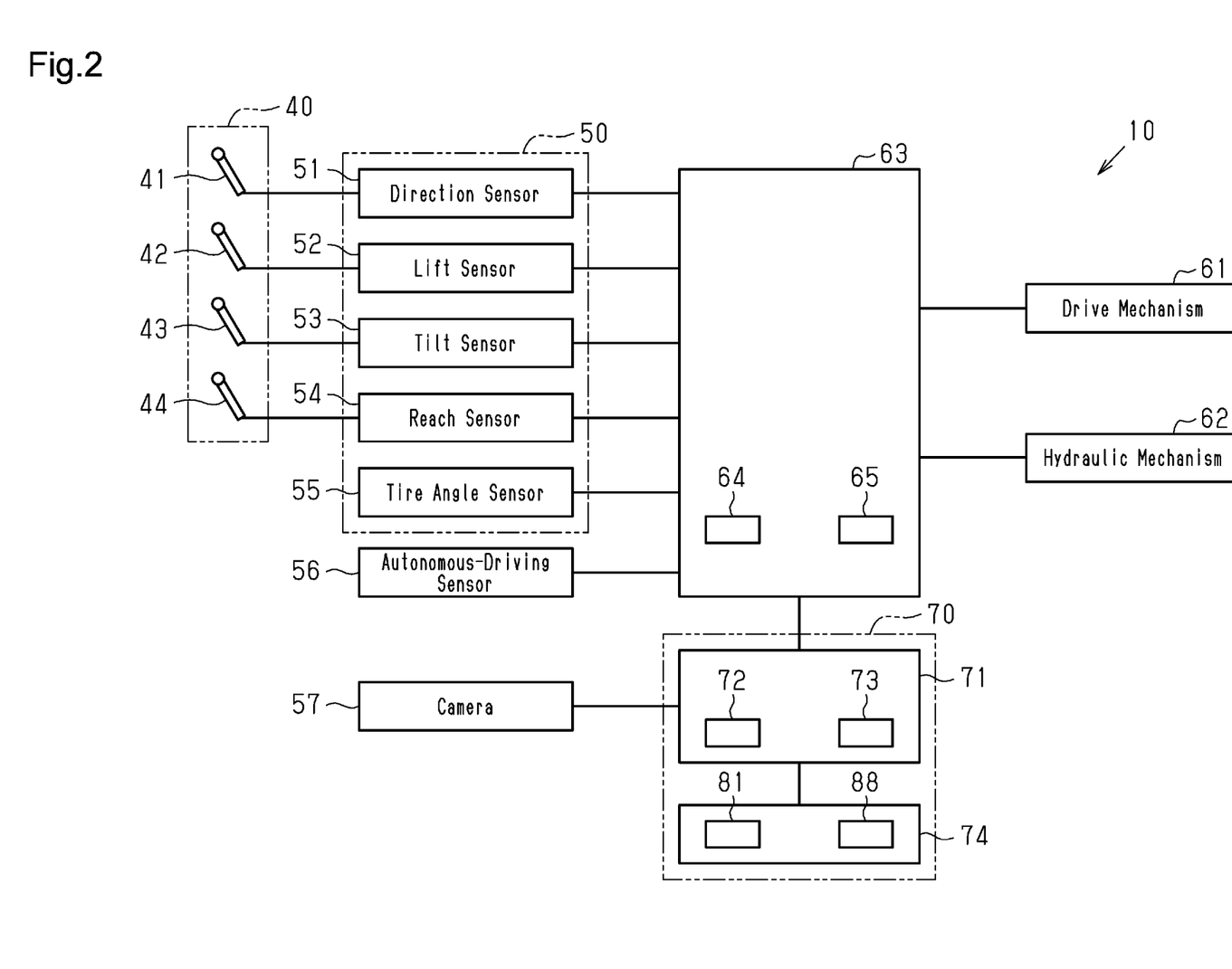
FIG. 2 is a schematic diagram showing the configuration of the material handling vehicle shown in FIG. 1.

As shown in FIG. 2, the manipulation portion 40 includes a direction manipulation unit 41, a lift manipulation unit 42, a tilt manipulation unit 43, and a reach manipulation unit 44. The manipulation portion 40 is manipulated when the material handling vehicle 10 is manually operated.

The direction manipulation unit 41 is a lever. The direction manipulation unit 41 is manipulated to be tilted forward or backward from a neutral position. The direction manipulation unit 41 is manipulated when the material handling vehicle 10 is caused to travel. The traveling direction of the material handling vehicle 10 is determined by the direction manipulation unit 41. The speed of the material handling vehicle 10 is adjusted by the direction manipulation unit 41. The traveling direction of the material handling vehicle 10 is a forward direction or a reverse direction.

The lift manipulation unit 42 is a lever. The lift manipulation unit 42 is manipulated to be tilted forward or backward from a neutral position. The lift manipulation unit 42 is manipulated to move the forks 26 vertically. The vertical moving direction of the forks 26 is determined by the lift manipulation unit 42. The vertical moving speed of the forks 26 is adjusted by the lift manipulation unit 42.

The tilt manipulation unit 43 is a lever. The tilt manipulation unit 43 is manipulated to be tilted forward or backward from a neutral position. The tilt manipulation unit 43 is operated to tilt the forks 26. The tilting direction of the forks 26 is determined by the tilt manipulation unit 43. The tilting speed of the forks 26 is adjusted by the tilt manipulation unit 43.

The reach manipulation unit 44 is a lever. The reach manipulation unit 44 is manipulated to be tilted forward or backward from a neutral position. The reach manipulation unit 44 is manipulated to move the forks 26 horizontally in the front-rear direction. The horizontal moving direction of the forks 26 is determined by the reach manipulation unit 44. The horizontal moving speed of the forks 26 is adjusted by the reach manipulation unit 44.

The material handling vehicle 10 includes sensors 50, an autonomous-driving sensor 56, a camera 57, a drive mechanism 61, a hydraulic mechanism 62, a vehicle controller 63, and an anomaly detection device 70.

The sensors 50 include a direction sensor 51, a lift sensor 52, a tilt sensor 53, a reach sensor 54, and a tire angle sensor 55.

The direction sensor 51 detects a manipulation value of the direction manipulation unit 41. The direction sensor 51 outputs an electric signal corresponding to the manipulation value of the direction manipulation unit 41 to the vehicle controller 63.

The lift sensor 52 detects a manipulation value of the lift manipulation unit 42. The lift sensor 52 outputs an electric signal corresponding to the manipulation value of the lift manipulation unit 42 to the vehicle controller 63.

The tilt sensor 53 detects a manipulation value of the tilt manipulation unit 43. The tilt sensor 53 outputs an electric signal corresponding to the manipulation value of the tilt manipulation unit 43 to the vehicle controller 63.

A reach sensor 54 detects a manipulation value of the reach manipulation unit 44. The reach sensor 54 outputs an electric signal corresponding to the manipulation value of the reach manipulation unit 44 to the vehicle controller 63.

The tire angle sensor 55 detects a steered angle of steered wheels. In the present embodiment, the tire angle sensor 55 detects the steered angle of the rear wheel 14. The tire angle sensor 55 outputs an electric signal corresponding to the steered angle to the vehicle controller 63.

The autonomous-driving sensor 56 is a sensor used when the material handling vehicle 10 is caused to operate autonomously. The autonomous-driving sensor 56 includes, for example, an external sensor used for self-position estimation of the material handling vehicle 10 and a distance meter used for alignment between the forks 26 and a target of material handling. The autonomous-driving sensor 56 outputs a detection result to the vehicle controller 63. The target of material handling is, for example, a material to be picked up by the material handling device 21 and a location at which the material is placed by the material handling device 21. The location at which the material is placed may be, for example, a truck or a shelf. The material includes a pallet and an object placed on the pallet.

The camera 57 includes a digital camera. The camera 57 includes an image sensor. The image sensor may be, for example, a charge coupled device (CCD) image sensor or a complementary metal oxide semiconductor (CMOS) image sensor. The camera 57 is a monocular camera. The camera 57 may be, for example, an RGB camera, an infrared camera, a grayscale camera, or a visible light camera. The camera 57 is disposed so as to capture an image of a range visually recognized by the operator when the operator is operating the material handling vehicle 10. The camera 57 is disposed to capture an image of a range forward of the driver's seat, for example. The camera 57 outputs image data acquired by imaging to the anomaly detection device 70.

The drive mechanism 61 is a member that causes the material handling vehicle 10 to travel. The drive mechanism 61 includes a drive source for driving the rear wheels 14 and a steering mechanism for steering the rear wheels 14. If the material handling vehicle 10 uses a motor as the drive source, the drive mechanism 61 includes a motor driver. If the material handling vehicle 10 uses an engine as the drive source, the drive mechanism 61 includes a fuel injection device.

The hydraulic mechanism 62 is a member that controls supply and discharge of hydraulic oil to and from hydraulic devices. The hydraulic devices include the lift cylinders 31, the tilt cylinders 32, and the reach cylinder 33. The hydraulic mechanism 62 includes a pump that discharges hydraulic oil and a control valve that controls supply and discharge of hydraulic oil to and from hydraulic devices.

The vehicle controller 63 performs a control related to a traveling operation and a control related to a material handling operation. The vehicle controller 63 includes a processor 64 and a storage unit 65. The processor 64 may include, for example, a central processing unit (CPU), a graphics processing unit (GPU), or a digital signal processor (DSP). The storage unit 65 includes a random-access memory (RAM) and a read-only memory (ROM). The storage unit 65 stores programs for operating the material handling vehicle 10. The storage unit 65 stores program codes or commands configured to cause the processor 64 to execute processes. The storage unit 65, which is a computer-readable medium, includes any type of medium that is accessible by a general-purpose computer or a dedicated computer. The vehicle controller 63 may include a hardware circuit such as an application specific integrated circuit (ASIC) and a field programmable gate array (FPGA). The vehicle controller 63, which is processing circuitry, may include one or more processors that operate according to a computer program, one or more hardware circuits such as an ASIC and an FPGA, or a combination thereof <Control Performed by Vehicle Controller During Manual Operation>

During manual operation of the material handling vehicle 10, the vehicle controller 63 causes the material handling vehicle 10 to travel in accordance with the detection result of the direction sensor 51. The vehicle controller 63 recognizes the manipulation value of the direction manipulation unit 41 from the detection result of the direction sensor 51. The vehicle controller 63 controls the drive mechanism 61 such that the material handling vehicle 10 travels at a speed corresponding to the manipulation value of the direction manipulation unit 41 in a traveling direction corresponding to the manipulation value of the direction manipulation unit 41.

When the material handling vehicle 10 is operated manually, the vehicle controller 63 causes the material handling vehicle 10 to perform a material handling operation in accordance with the detection results of the lift sensor 52, the tilt sensor 53, and the reach sensor 54. The vehicle controller 63 recognizes the manipulation value of the lift manipulation unit 42 from the detection result of the lift sensor 52. The vehicle controller 63 controls the hydraulic mechanism 62 such that the forks 26 move up and down at a speed corresponding to the manipulation value of the lift manipulation unit 42 in a vertical moving direction corresponding to the manipulation value of the lift manipulation unit 42. The vehicle controller 63 recognizes the manipulation value of the tilt manipulation unit 43 from the detection result of the tilt sensor 53. The vehicle controller 63 controls the hydraulic mechanism 62 such that the forks 26 tilt in a tilting direction corresponding to the manipulation value of the tilt manipulation unit 43 at a speed corresponding to the manipulation value of the tilt manipulation unit 43. The vehicle controller 63 recognizes the manipulation value of the reach manipulation unit 44 from the detection result of the reach sensor 54. The vehicle controller 63 controls the hydraulic mechanism 62 such that the forks 26 move at a speed corresponding to the manipulation value of the reach manipulation unit 44 in a horizontal moving direction corresponding to the manipulation value of the reach manipulation unit 44.

<Control Performed by Vehicle Controller During Autonomous Operation>

During an autonomous operation of the material handling vehicle 10, the vehicle controller 63 generates a route while estimating the self-position using the autonomous-driving sensor 56. The vehicle controller 63 controls the drive mechanism 61 so that the material handling vehicle 10 follows the route. At this time, the vehicle controller 63 controls the drive mechanism 61 by generating a command value related to the traveling operation. The command value related to the traveling operation is a command related to the traveling direction of the material handling vehicle 10 and the speed of the material handling vehicle 10. The command value is a virtual manipulation value of the direction manipulation unit 41.

During an autonomous operation of the material handling vehicle 10, the vehicle controller 63 performs alignment of the forks 26 while recognizing the positions of the target of material handling and the forks 26 using the autonomous-driving sensor 56. At this time, the vehicle controller 63 controls the hydraulic mechanism 62 by generating command values related to the material handling operation. The command values related to the material handling operation include a command value related to the vertical moving direction of the forks 26 and the vertical moving speed of the forks 26, a command value related to the tilting direction of the forks 26 and the tilting speed of the forks 26, and a command value related to the horizontal moving direction of the forks 26 and the horizontal moving speed of the forks 26. The command value related to the vertical moving direction of the forks 26 and the vertical moving speed of the forks 26 is a virtual manipulation value of the lift manipulation unit 42. The command value related to the tilting direction of the forks 26 and the tilting speed of the forks 26 is a virtual manipulation value of the tilt manipulation unit 43. The command value related to the horizontal moving direction of the forks 26 and the horizontal moving speed of the forks 26 is a virtual manipulation value of the reach manipulation unit 44.

<Anomaly Detection Device>

The anomaly detection device 70 includes a controller 71 and an auxiliary storage device 74.

The controller 71, which is processing circuitry, includes, for example, a hardware configuration similar to that of the vehicle controller 63. The controller 71 includes a processor 72 and a storage unit 73. The image data output from the camera 57 is input to the controller 71. The controller 71 and the vehicle controller 63 acquire information from each other through a communication protocol for vehicles.

The auxiliary storage device 74, which is a memory, stores information that can be read by the controller 71. The auxiliary storage device 74 may be, for example, a hard disk drive or a solid state drive. The auxiliary storage device 74 stores a model 81, which is map data. The auxiliary storage device 74 stores association data 88. The auxiliary storage device 74 is a storage device.

The model 81 defines a map (function). When input data is input to the map, the map outputs, as output data, a state ID corresponding to a state related to the material handling vehicle 10.

The association data 88 associates the state ID with the state related to the material handling vehicle 10. The state related to the material handling vehicle 10 may include, for example, an approach state, an inclination state, a pallet interference state, a long-distance state, a state in which a material exists on the far side, and a material interference state. The approach state refers to a state in which the material handling vehicle 10 is approaching a material to be picked up. The inclination state refers to a state in which an inclination angle of a place where a material is placed or a place where a material is to be placed is excessively large. The pallet interference state refers to a state in which adjacent pallets are in contact with each other. The long-distance state refers to a state in which the material handling vehicle 10 cannot be brought close to a position at which material handling can be performed. The long-distance condition may occur, for example, in a situation in which a material on the loading platform of a truck is picked up. When a material on the loading platform of a truck is picked up, the material handling vehicle 10 approaches the truck. Since the material handling vehicle 10 needs to approach the truck within a range in which the material handling vehicle 10 does not come into contact with the truck, the material handling vehicle 10 may not be able to approach a position at which the material handling vehicle 10 can pick up the material on the loading platform. The state in which a material exists on the far side includes a state in which a material exists on the far side of the place at which another material is to be placed, and that the material to be placed will possibly contact the material on the far side. The state in which a material exists on the far side includes a state in which a material exists on the far side of another material to be picked up, and that the material to be picked up may contact the material on the far side. The material interference state includes a state in which a material is in contact with a pallet different from the pallet on which the material is placed. The material interference state includes a state in which a material is in contact with a material placed on a pallet different from the pallet on which the first material is placed.

The approach state, the inclination state, the pallet interference state, the long-distance state, the state in which a material exists on the far side, and the material interference state are each a state related to the material handling operation. The case of the inclination state, the pallet interference state, the long-distance state, the state in which a material exists on the far side, and the material interference state may hinder the material handling operation by the material handling vehicle 10. These states are each an anomaly state related to the material handling operation. As such, the association data 88 associates the state ID with an anomaly state related to the material handling vehicle 10.

<Anomaly Detection Control>

Figure 3:
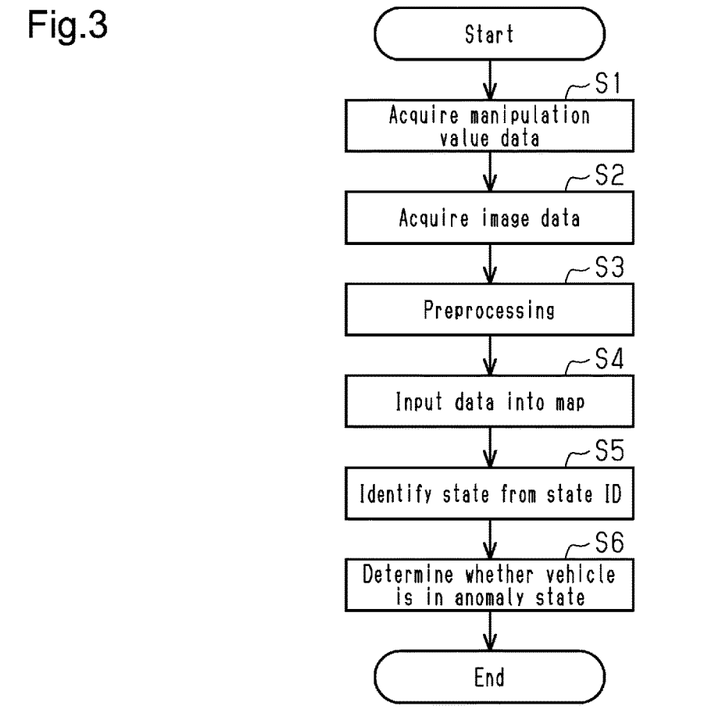
FIG. 3 is a flowchart showing an anomaly detection control executed by an anomaly detection device mounted on the material handling vehicle shown in FIG. 1.

The controller 71 executes an anomaly detection control. The anomaly detection control is repeatedly executed at a predetermined control cycle during activation of the material handling vehicle 10, for example. The anomaly detection control executed when the material handling vehicle 10 is operating autonomously will be described.

As shown in FIG. 3, in step S1, the controller 71 acquires manipulation value data of the material handling vehicle 10. The manipulation value data includes data representing the manipulation value of the direction manipulation unit 41, data representing the manipulation value of the lift manipulation unit 42, data representing the manipulation value of the tilt manipulation unit 43, data representing the manipulation value of the reach manipulation unit 44, and data representing the steered angle. The data representing the manipulation value of the direction manipulation unit 41, the data representing the manipulation value of the lift manipulation unit 42, the data representing the manipulation value of the tilt manipulation unit 43, and the data representing the manipulation value of the reach manipulation unit 44 are command values generated by the vehicle controller 63. The data representing the steered angle is a detection result of the tire angle sensor 55. The controller 71 acquires command values representing the respective manipulation values and a detection result of the tire angle sensor 55 from the vehicle controller 63. The manipulation value data represents manipulation values that reflect manipulations that would be performed by an operator if the operator manually manipulated the material handling vehicle 10. In other words, the manipulation value data represents values that can be changed at will by the operator. The data representing the manipulation value of the manipulation portion 40 is manipulation value data that changes in accordance with the amount of manipulation of the manipulation portion 40 by the operator. The data representing the steered angle is manipulation value data that changes in accordance with the amount of manipulation of the steering wheel by the operator.

Next, in step S2, the controller 71 acquires an image data from the camera 57.

Subsequently, in step S3, the controller 71 performs preprocessing on the manipulation value data and the image data. In the preprocessing, synchronization, feature extraction, and coupling of the manipulation value data and the image data are performed.

Figure 4:
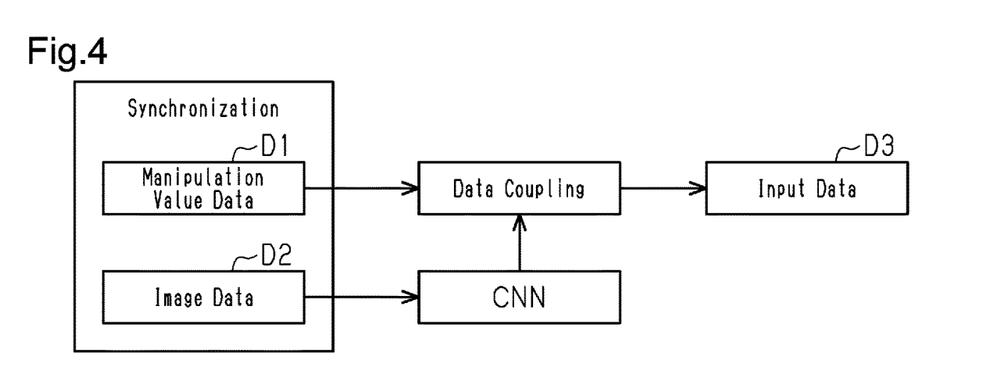
FIG. 4 is an explanatory diagram for explaining preprocessing executed in the anomaly detection control shown in FIG. 3.

As shown in FIG. 4, the controller 71 synchronizes manipulation value data D1 with image data D2 by matching the sampling rates of the manipulation value data D1 and the image data D2.

The controller 71 extracts a feature from the image data D2. The feature is extracted from the image data D2 by using a deep learning model. In the present embodiment, the controller 71 extracts a feature from the image data D2 by using a convolution neural network.

Figure 5:
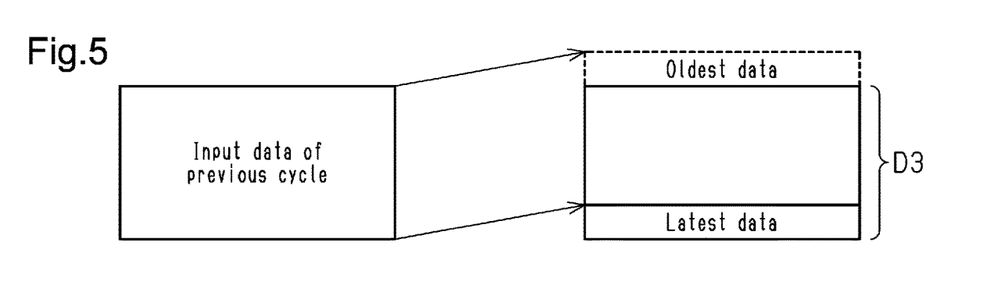
FIG. 5 is a diagram showing input data used in the anomaly detection control shown in FIG. 3.

The controller 71 generates input data D3 by coupling the manipulation value data D1 with the feature acquired from the image data D2. As shown in FIG. 5, the input data D3 is generated to become a time-series data for a certain period of time by deleting the oldest data while adding the latest data.

Next, in step S4, the controller 71 inputs the input data D3 into a map defined by the model 81, as shown in FIG. 3. The model 81 is a pre-trained model that has been trained by machine learning. In the map, the manipulation value represented by the manipulation value data D1 and the pixel value of the image data are input variables, and the state ID is an output variable.

Figure 6:
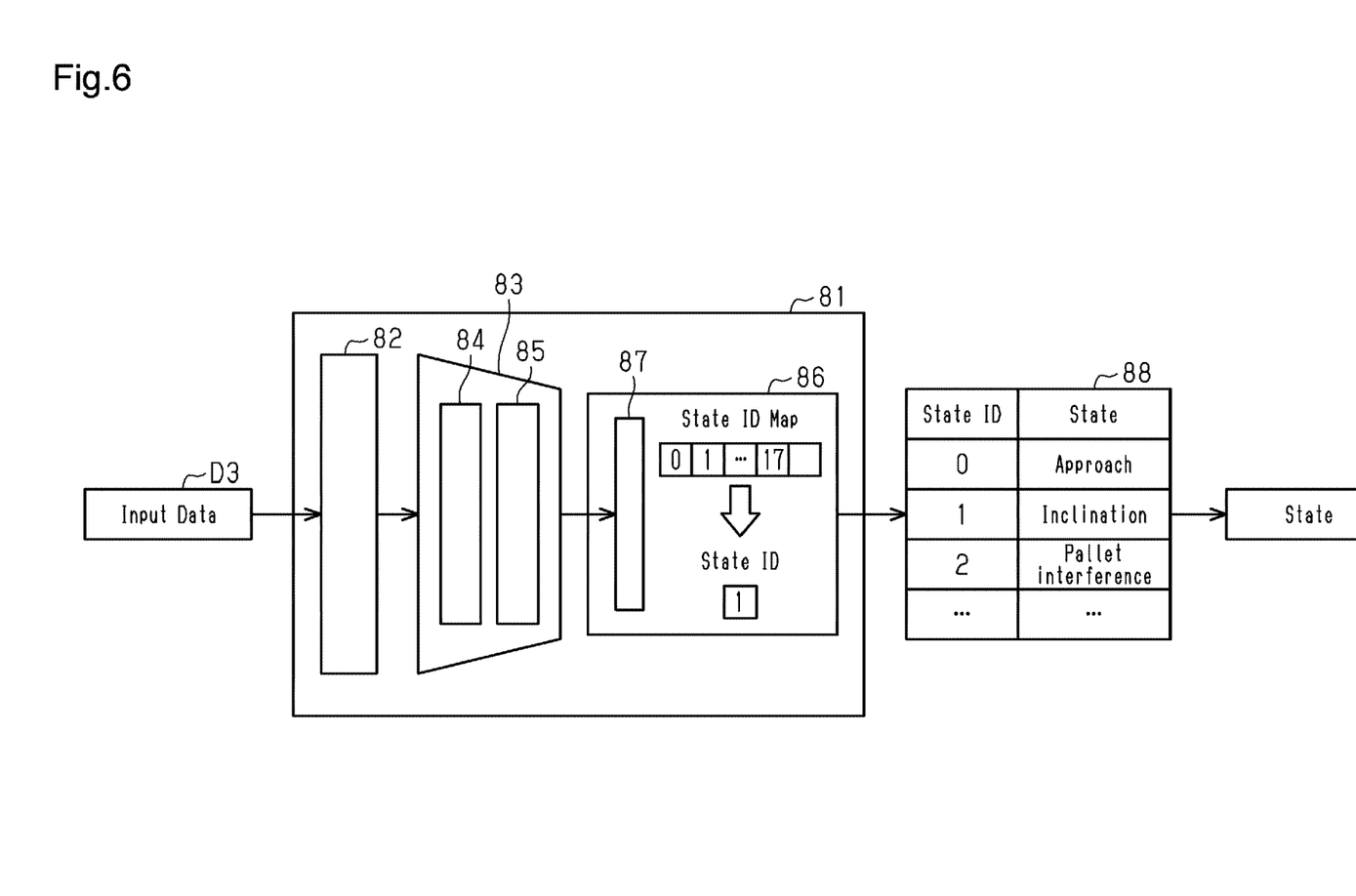
FIG. 6 is a schematic diagram showing the configuration of a model used in the anomaly detection control shown in FIG. 3.

As illustrated in FIG. 6, the model 81 includes an input unit 82, a feature extraction unit 83, and a state estimation unit 86.

The input unit 82 receives the input data D3. The input unit 82 generates tokens by dividing the input data D3.

The feature extraction unit 83 includes a position embedding layer 84 and a self-attention layer 85.

The position embedding layer 84 adds positional information to the tokens. More specifically, the position embedding layer 84 adds, to each token, an eigenvector corresponding to the position of the token as positional information.

The self-attention layer 85 calculates a point of gaze from the input data D3. The self-attention layer 85 calculates three vectors: query, key, and value. The self-attention layer calculates an inner product of the query and the key, and calculates the degree of association between the query and the key by applying a softmax function to the inner product. The self-attention layer 85 calculates a weighted sum of the value in accordance with the degree of association between the query and the key. Accordingly, the feature extraction unit 83 extracts a feature vector, which is the feature of each token.

The state estimation unit 86 estimates the state ID from the feature vector. The state estimation unit 86 includes a discretization layer 87. The discretization layer 87 calculates a distance between the feature vector and a state vector. The discretization layer 87 identifies a state vector having the smallest distance from the feature vector. The state vector is a discrete value. The discretization layer 87 can convert the feature vector into a discrete value. The discretization layer 87 derives the state ID associated with the state vector from the state ID map. The state ID map is a map in which a state vector is associated with a state ID. The state estimation unit 86 identifies a state vector having the smallest distance from the feature vector, and outputs a state ID associated with the identified state vector as the current state ID.

Next, in step S5, the controller 71 identifies, from the association data 88, a state related to the material handling vehicle 10, which is associated with the state ID obtained in step S4, as shown in FIG. 3. This allows the controller 71 to identify the current state of the material handling vehicle 10. A case will now be discussed in which the approach state is associated with the state ID of 0 in the association data 88. When the state ID obtained in step S4 is 0, the controller 71 determines that the current state of the material handling vehicle 10 is the approach state. A case will now be discussed in which the inclination state is associated with the state ID of 1 in the association data 88. When the state ID obtained in step S4 is 1, the controller 71 determines that the current state of the material handling vehicle 10 is the inclination state.

Next, in step S6, the controller 71 determines whether the material handling vehicle 10 is in an anomaly state based on the current state of the material handling vehicle 10. By classifying states related to the material handling vehicle 10 into anomaly states and normal states in advance, the controller 71 can determine whether the material handling vehicle 10 is in a normal state or an anomaly state. In the above-described example, when the state related to the material handling vehicle 10 is the approach state, the controller 71 determines that the material handling vehicle 10 is in a normal state. When the state related to the material handling vehicle 10 is the pallet interference state, the long-distance state, the state in which a material exists on the far side, or the material interference state, the controller 71 determines that the material handling vehicle 10 is in an anomaly state. As a result, the anomaly detection device 70 detects an anomaly related to the material handling vehicle 10.

When the controller 71 determines that the material handling vehicle 10 is in an anomaly state, the subsequent control is optional. When the vehicle controller 63 can cause the material handling vehicle 10 to perform an operation responding to the anomaly state, the vehicle controller 63 may perform control responding to the anomaly state. The vehicle controller 63 may stop the material handling vehicle 10. The vehicle controller 63 or the controller 71 may notify the host controller of the anomaly state of the material handling vehicle 10.

When the material handling vehicle 10 is operated manually, the manipulation value obtained from the sensor 50 may be used as the manipulation value data D1. In this way, the state related to the material handling vehicle 10 can be identified regardless of whether the material handling vehicle 10 is operating autonomously or is operated manually.

In a case in which the material handling vehicle 10 is operated manually, when the controller 71 determines that the material handling vehicle 10 is in an anomaly state, the operator may be notified of the anomaly state. For example, the notification may be performed by display on a display unit that is visible to the operator, or may be performed by lighting a lamp or activating a buzzer.

<Model Generation Method>

A method of generating the model 81 will now be described. The model 81 is generated by self-supervised learning. Hereinafter, a case in which a vector quantized-variational auto encoder (VQ-VAE) is used as a learning model will be described.

Figure 7:
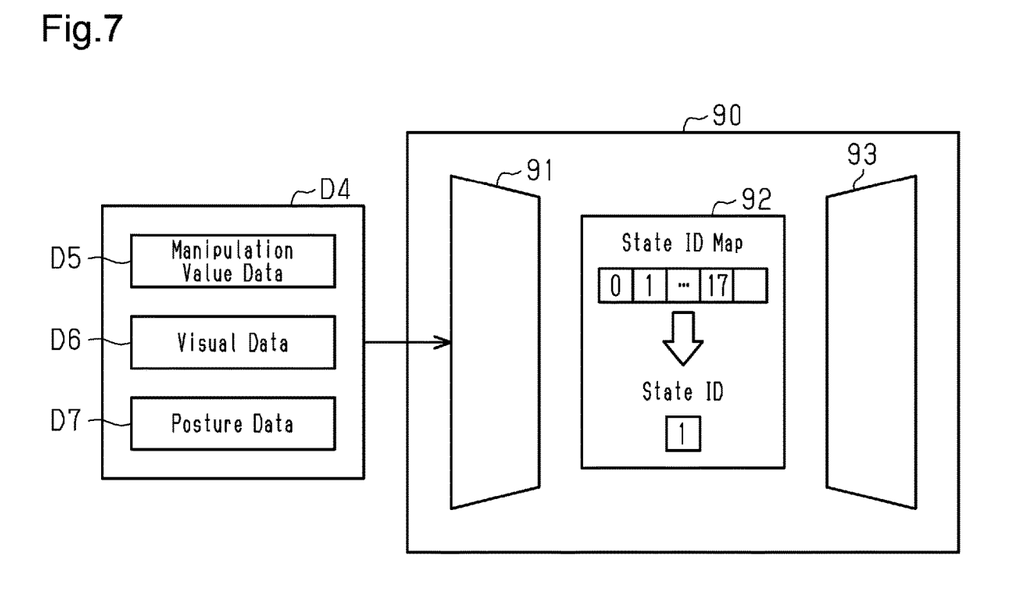
FIG. 7 is a schematic diagram showing the configuration of a learning model for generating the model shown in FIG. 6.

As illustrated in FIG. 7, a learning model 90 includes an encoder 91 and a decoder 93. The learning model 90 extracts a state vector, which is a feature, from learning data D4 and reconstructs the learning data D4 from the state vector, thereby forming a state estimation unit 92. The state estimation unit 92 is a latent space to which the state vector belongs.

The learning data D4 is input to the encoder 91. The encoder 91 extracts a latent variable, which is a feature, from the learning data D4.

The state estimation unit 92 converts the latent variable into a finite number of discrete values by mapping the latent variable to the state ID map. The discrete values are state vectors. The state ID map associates a state vector with a state ID. The state estimation unit 92 replaces the latent variable with the closest state vector.

The decoder 93 reconstructs the learning data D4 from the state vector.

The learning data D4 includes manipulation value data D5 when the operator manipulates the material handling vehicle 10, visual data D6 when the operator manipulates the material handling vehicle 10, and posture data D7 when the operator manipulates the material handling vehicle 10. The learning data D4 can be acquired by using a material handling vehicle having the same specifications as the material handling vehicle 10. The material handling vehicle having the same specification is a material handling vehicle that performs the same operation at the same speed when the same manipulation value is input in the same surrounding environment. As an example, a case in which the learning data D4 is acquired by using the material handling vehicle 10 will be described.

The manipulation value data D5 is acquired from the direction sensor 51, the lift sensor 52, the tilt sensor 53, the reach sensor 54, and the tire angle sensor 55. The visual data D6 represents a point of gaze of the operator when the operator manipulates the material handling vehicle 10. The visual data D6 is acquired from an eye tracker worn by the operator. The eye tracker performs measurement of line of sight. The posture data D7 is data related to the posture of the operator when the operator manipulates the material handling vehicle 10. More specifically, the posture data D7 represents a posture angle and joint coordinates of the operator when the operator operates the material handling vehicle 10. The posture data D7 is acquired by using a posture sensor. The posture sensor is, for example, a camera that captures images of the operator or a depth sensor.

The state related to the material handling vehicle 10 is correlated with the manipulation value data D5. For example, when the state related to the material handling vehicle 10 is the approach state, the manipulation value of the direction manipulation unit 41 is assumed to be a value that instructs the material handling vehicle 10 to move forward. When the state related to the material handling vehicle 10 is the inclination state, the manipulation value of the tilt manipulation unit 43 may change as the operator of the material handling vehicle 10 adjusts the inclination angle of the forks 26. When the state related to the material handling vehicle 10 is the pallet interference state, the steered angle may be changed in order to cancel the state in which the pallets are in contact with each other. In this way, it is possible to determine what the state related to the material handling vehicle 10 was from the manipulation value data D5.

The point of gaze of the operator changes depending on the state related to the material handling vehicle 10. For example, when the state related to the material handling vehicle 10 is the approach state, the point of gaze of the operator is assumed to be on a pallet. When the state related to the material handling vehicle 10 is the inclination state, the point of gaze of the operator is assumed to be on an inclined location, that is, a location at which a pallet is placed or a location on which the material is to be placed. When the state related to the material handling vehicle 10 is the pallet interference state, the point of gaze of the operator is assumed to be on a spot at which pallets are in contact with each other. In this way, it is possible to determine the place on which the point of gaze of the operator has been from the visual data D6.

The posture of the operator changes depending on the state related to the material handling vehicle 10. For example, when the state related to the material handling vehicle 10 is the pallet interference state or the long-distance state, the operator is assumed to be in a posture leaning forward on the material handling vehicle 10 in order to check the state of the pallet. When the operator's vision is blocked by the material handling device 21, the operator may look over the material handling device 21 at the pallet through the left or right side of the material handling vehicle 10.

As described above, the manipulation value data D5 and visual data D6 are used as the learning data D4. Accordingly, the model 81 reflects the location to which the operator of the material handling vehicle 10 was paying attention in accordance with the state related to the material handling vehicle 10. That is, it is possible to learn which parts of the image data D2 should be focused on when extracting a feature vector in accordance with the state related to the material handling vehicle 10. Further, since the posture data D7 is used as the learning data D4, the model 81 can reflect in what posture the operator of the material handling vehicle 10 was in accordance with the state related to the material handling vehicle 10. The model 81 defines a map that receives, as input data, the manipulation value data D1, the image data D2, and the posture data, thereby outputting the state ID that corresponds to the state related to the material handling vehicle 10.

After learning is performed by the learning data D4, the encoder 91 and the state estimation unit 92 of the learning model 90 are used in the model 81.

<Method of Generating Association Data>

The association data 88 is generated after the model 81 is generated. By generating the model 81 as described above, a state ID map is acquired in which the state ID is associated with a state vector. The state ID is an ID unique to the state related to the material handling vehicle 10. To which state the state ID corresponds, among the states related to the material handling vehicle 10, can be acquired, for example, by a person checking the learning data D4. The association data 88 is generated by associating the state ID with the state related to the material handling vehicle 10 corresponding to the state ID.

Operation of Present Embodiment

During an operation of a vehicle, the state related to the vehicle changes in accordance with the vehicle itself and the surrounding environment of the vehicle. In particular, during a material handling operation of the material handling vehicle 10, an anomaly state may occur depending on the target of material handling. The operator of the material handling vehicle 10 may notice such an anomaly state. In the present embodiment, when an anomaly state occurs, the anomaly state is identified by what place the operator of the material handling vehicle 10 is paying attention to. The manipulation value data D5 and the visual data D6 are correlated with the state related to the material handling vehicle 10. The model 81, which is acquired by using the manipulation value data D5 and the visual data D6 as the learning data D4, represents what kind of place the operator paid attention to when acquiring the state related to the material handling vehicle 10.

The use of the manipulation value data D1 and the image data D2 as the input data D3 allows the controller 71 to acquire the state ID corresponding to the state related to the material handling vehicle 10. In particular, the use of the model 81 generated as described above allows for extraction of a feature vector based on the degree of association between the manipulation value data D1 and the position of the image data D2. That is, it is possible to extract a feature vector by focusing on places in the image data D2 that are highly relevant to the state related to the material handling vehicle 10.

Advantages of Present Embodiment (1) The controller 71 inputs the manipulation value data D1 and the image data D2 to the map as the input data D3. This allows the controller 71 to acquire the state ID corresponding to the state related to the material handling vehicle 10 as the output data. The association data 88 associates the state ID with the state related to the material handling vehicle 10. The controller 71 is able to identify an anomaly state related to the material handling vehicle 10 from the state ID and the association data 88.

(2) The material handling vehicle 10 is used in various places such as a maritime port, a commercial facility, or a factory. Also, the type of pallet and type of material may vary from user to user. Therefore, unknown data is likely to be input as the input data D3. Since the state ID is output using the map defined by the machine-learned model 81, it is possible to identify an anomaly state of the material handling vehicle 10 even when unknown data is input as the input data D3.

(3) The model 81 includes the discretization layer 87. The discretization layer 87 converts a feature vector into a state vector, which is a discrete value. That is, the model 81 can convert the input data D3, which is time-series data, into a discrete value. Thus, the model 81 can classify the time-series data into the state ID corresponding to the state related to the material handling vehicle 10.

(4) The model 81 is generated by self-supervised learning. When a model is generated by supervised learning, it is necessary to label the learning data D4. In contrast, in the case of the self-supervised learning, it is only necessary to associate the state related to the material handling vehicle 10 with the state ID. This reduces time and effort required as compared with the case of labeling.

(5) Even when a manual operation is performed by the operator, the controller 71 can identify an anomaly state related to the material handling vehicle 10. Since the controller 71 notifies the operator of an anomaly state related to the material handling vehicle 10, the operator recognizes the anomaly state even if the operator has overlooked the anomaly state.

Modifications

The above-described embodiment may be modified as follows. The above-described embodiment and the following modifications can be combined as long as the combined modifications remain technically consistent with each other.

The vehicle does not necessarily need to be the material handling vehicle 10. For example, the vehicle may be a passenger car, a tractor, or a carrier vehicle. The material handling vehicle 10 may be a counterbalance forklift. In this way, the type of vehicle may be changed. In this case, an individual model 81 is generated for each type of vehicle. For example, in the case of a counterbalance forklift, a model may be generated using data representing a manipulation value of an accelerator sensor instead of the direction sensor 51.

The material handling vehicle 10 may include an attachment. In this configuration, if the material handling vehicle 10 includes an attachment operation unit for operating the attachment, it is preferable that the learning data D4 include data representing a manipulation value of the attachment operation unit. The attachment may be, for example, a side shift device that moves the forks 26 in the left-right direction or a clamp device that clamps a cylindrical material.

The material handling vehicle 10 including the anomaly detection device 70 may be a material handling vehicle capable of performing only an autonomous operation. In this case, the learning data D4 may be acquired by using the material handling vehicle including the manipulation portion 40 and the sensor 50, and the material handling vehicle 10 including the anomaly detection device 70 does not necessarily need to include the manipulation portion 40 or the sensor 50.

The material handling vehicle 10 including the anomaly detection device 70 may be a material handling vehicle capable of performing only a manual operation.

Figure 8:
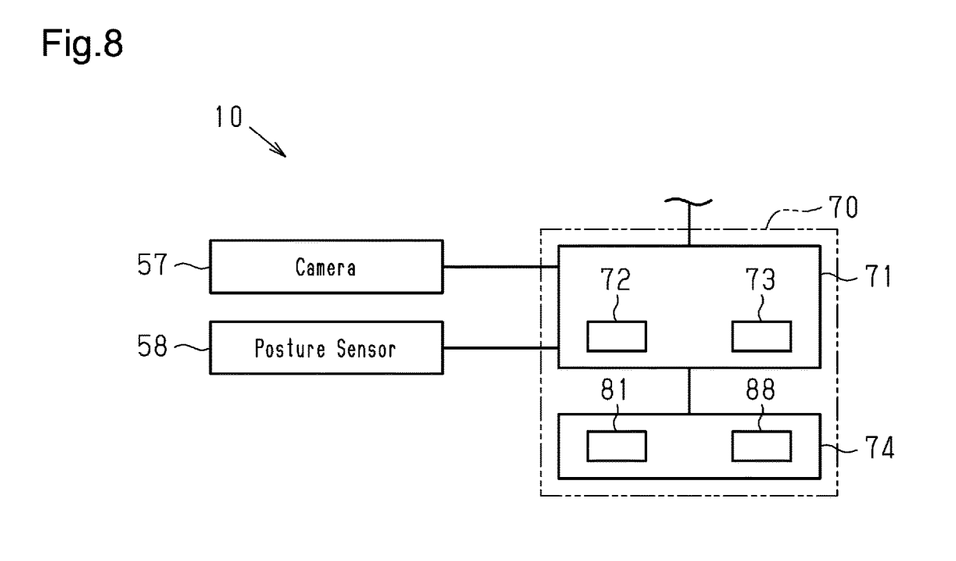
FIG. 8 is a schematic diagram showing the configuration of an anomaly detection device according to a modification.

As shown in FIG. 8, the material handling vehicle 10 may include a posture sensor 58. The posture sensor 58 may be, for example, a camera that captures images of the operator or a depth sensor. The posture sensor 58 detects posture data. The posture data is similar to the posture data D7. When executing the anomaly detection control, the controller 71 uses, as the input data D3, the manipulation value data D1, the image data D2, and the posture data acquired from the posture sensor 58. In this case, the material handling vehicle is operated by the operator on board the material handling vehicle 10. That is, the vehicle in this modification is the material handling vehicle 10 described in the above embodiment or a material handling vehicle that can only be operated manually. The use of the posture data as the input data D3 improves the accuracy with which the anomaly detection device 70 identifies an anomaly state.

The model 81 subjected to additional learning according to the user of the material handling vehicle 10 may be used. The material handling vehicle 10 is used in various places such as a maritime port, a commercial facility, or a factory. Also, the type of pallet and type of material may vary from user to user. Therefore, an anomaly state unique to the user may occur in the material handling vehicle 10. The model 81 suitable for the user can be obtained by performing additional learning using, as the learning data D4, the manipulation value data D5, the visual data D6, and the posture data D7 that are acquired when the user uses the material handling vehicle 10.

The state related to the material handling vehicle 10 may include a state related to a traveling operation. The state related to the traveling operation may include, for example, an anomaly state related to the traveling operation, such as the material handling vehicle 10 being unable to travel due to an obstacle. In a case in which the material handling vehicle 10 performs vehicle speed limitation when a specific condition is met, the state related to the traveling operation may include a vehicle speed limitation state. The specific condition may be, for example, that the material handling vehicle 10 is traveling at a specific location or that a specific obstacle is detected. The specific obstacle may be, for example, a person.

The learning data D4 may include only the manipulation value data D5 and the visual data D6. In this case, the model 81 defines a map that receives the manipulation value data D1 and the image data D2, thereby outputting the state ID corresponding to the state related to the material handling vehicle 10.

The model 81 may be generated by unsupervised learning. For example, the learning data D4 may be classified into groups by using an algorithm for extracting a group structure from the learning data D4. Each group may be used as a state ID, and the state related to the material handling vehicle 10 may be associated with the state ID by the association data 88.

The camera 57 may be used for purposes different from the anomaly detection control. For example, when the vehicle controller 63 autonomously operates the material handling vehicle 10, the vehicle controller 63 may perform a control using the image data D2. For example, the vehicle controller 63 may align a pallet and the forks 26 using the image data D2.

The material handling vehicle 10 may be operated remotely. In this case, the operator operates the material handling vehicle 10 at a remote location away from the material handling vehicle 10. The operator operates the material handling vehicle 10 while viewing the image captured by a camera provided in the material handling vehicle 10. The camera used at this time may be the camera 57.

The association data 88 may be any data in which an anomaly state related to the material handling vehicle 10 is associated with a state ID. Therefore, the state associated with the state ID by the association data 88 does not necessarily need to include the normal state.

The model 81 and the association data 88 may be stored in the storage unit 73 instead of the auxiliary storage device 74. In this case, the storage unit 73 is a storage device. The controller 71 is the anomaly detection device 70. One of the model 81 and the association data 88 may be stored in the storage unit 73, and the other may be stored in the auxiliary storage device 74. In this case, the storage unit 73 and the auxiliary storage device 74 form a storage device.

The anomaly detection device does not necessarily need to be included in the material handling vehicle 10. For example, the anomaly detection device may be provided at a location where the material handling vehicle 10 is operated or at a remote location away from the location where the material handling vehicle 10 is operated. In this case, each of the material handling vehicle 10 and the anomaly detection device includes a communication device. The communication devices are capable of performing communication by any wireless communication method such as a wireless LAN, Zigbee (registered trademark), low power wide area (LPWA) network, or a mobile communication system. In this case, the vehicle controller 63 transmits the manipulation value data and the image data to the anomaly detection device by the communication device. The anomaly detection device acquires manipulation value data and image data by receiving the manipulation value data and the image data, using the communication device. Then, the anomaly detection device executes the processes of steps S3 to S6 using the manipulation value data and the image data acquired from the material handling vehicle 10. In this case, the anomaly detection device may transmit the detection result to the material handling vehicle 10.

The anomaly detection device may include a first device, which is included in the material handling vehicle 10, and a second device, which is provided at a location where the material handling vehicle 10 is operated or at a remote location away from the location where the material handling vehicle 10 is operated. Each of the first device and the second device includes, for example, a hardware configuration similar to that of the anomaly detection device of the above-described embodiment. Each of the first device and the second device includes a communication device. The first device performs part of the processes of step S3 to step S5. The second device performs processes subsequent to the processes performed by the first device. For example, the first device generates the input data D3 by performing the processes of steps S1 to S3. The first device transmits the input data D3 to the second device by means of the communication device. The second device receives the input data D3 by means of the communication device. The second device performs the processes of step S4 to step S6 using the input data D3. In this case, the second device may transmit the detection result to the first device.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An anomaly detection device configured to detect an anomaly related to a vehicle, the anomaly detection device comprising:
   processing circuitry; and
   a memory, wherein
   the memory stores
   map data that defines a machine learning model configured to receive, as input data, manipulation value data and the image data of the vehicle, thereby outputting, as output data, a state ID corresponding to an anomaly state related to the vehicle, and
   association data that associates an anomaly state related to the vehicle with the state ID,
   the processing circuitry is configured to
   acquire the manipulation value data,
   acquire the image data from a camera mounted in the vehicle,
   input, as the input data, the manipulation value data and the image data, to the machine learning model, thereby acquire, as the output data, the state ID from the machine learning model, and
   identify the anomaly state related to the vehicle based on the state ID; and
   control the vehicle to perform a specific response action based on the identified anomaly state, including at least one of: stopping the vehicle, displaying a notification that is visible to the operator, illuminating a lamp that is visible to the operator, or activating a buzzer to produce an audible alert signal.

2. The anomaly detection device according to claim 1, wherein
   the vehicle is a material handling vehicle, and
   the anomaly state related to the vehicle includes an anomaly state related to a material handling operation.

3. The anomaly detection device according to claim 1, wherein
   the machine learning model includes:
   a feature extractor configured to extract a feature vector from the input data; and
   a discretization layer configured to convert the feature vector into a discrete value associated with the state ID.

4. The anomaly detection device according to claim 1, wherein
   the vehicle is a vehicle operated by an operator aboard the vehicle, and includes a posture sensor,
   the machine learning model outputs the state ID as the output data when receiving, as the input data, the manipulation value data, the image data, and posture data related to a posture of the operator, and
   the processing circuitry is configured to
   acquire the posture data from the posture sensor, and
   input, as the input data, the manipulation value data, the image data and the posture data to the machine learning model.

5. A vehicle, comprising the anomaly detection device according to claim 1.

6. An anomaly detection method for detecting an anomaly related to a vehicle, the anomaly detection method comprising:
   storing map data and association data in a memory,
   the map data defining a machine learning model configured to output, as output data, a state ID corresponding to an anomaly state related to the vehicle, when receiving input data comprising manipulation value data, image data of the vehicle, and
   the association data that associates an anomaly state related to the vehicle with the state ID;
   acquiring the manipulation value data of the vehicle;
   acquiring the image data from a camera mounted in the vehicle;
   inputting, as input data, manipulation value data and the image data into the machine learning model, thereby acquiring, as output data, a state ID corresponding to an anomaly state related to the vehicle; and
   identifying the anomaly state related to the vehicle based on the state ID; and
   controlling the vehicle to perform a specific response action based on the identified anomaly state, including at least one of: stopping the vehicle, displaying a notification that is visible to the operator, illuminating a lamp that is visible to the operator, or activating a buzzer to produce an audible alert signal.

* * * * *